United States Patent [19]

Matsushima

[11] Patent Number: 5,588,656
[45] Date of Patent: Dec. 31, 1996

[54] CRANKSHAFT SEAL HAVING RESILIENT PORTION EMBEDDED IN RIGID RETAINER

[75] Inventor: Noboru Matsushima, Fukushima, Japan

[73] Assignee: NOK Corporation, Tokyo, Japan

[21] Appl. No.: 383,489

[22] Filed: Feb. 3, 1995

[30] Foreign Application Priority Data

Feb. 7, 1994 [JP] Japan ................. 6-035319

[51] Int. Cl.$^6$ ................................. F16J 15/32
[52] U.S. Cl. .................. 277/35; 277/153; 277/183; 277/189
[58] Field of Search ................. 277/35, 36, 37, 277/50, 152, 153, 178, 181, 183, 189

[56] References Cited

U.S. PATENT DOCUMENTS

| | | |
|---|---|---|
| 3,601,417 | 8/1971 | Szepesvary ................. 277/181 |
| 4,021,049 | 5/1977 | Phelps et al. ................. 277/153 |
| 4,202,555 | 5/1980 | Becker et al. ................. 277/153 |
| 4,799,691 | 1/1989 | Stritzke et al. . |
| 4,928,980 | 5/1990 | Deuring ................. 277/181 |
| 5,152,538 | 10/1992 | Mims . |
| 5,199,721 | 4/1993 | Schmitt ................. 277/183 |

FOREIGN PATENT DOCUMENTS

| | | | |
|---|---|---|---|
| 576539 | 5/1989 | Canada ................. | 277/153 |
| 0460366 | 12/1991 | European Pat. Off. ........ | 277/152 |
| 544881 | 4/1942 | United Kingdom ........ | 277/153 |
| 551152 | 2/1953 | United Kingdom ........ | 277/183 |
| 1371341 | 10/1974 | United Kingdom ........ | 277/153 |
| 2172941 | 10/1986 | United Kingdom ........ | 277/153 |
| 2147666 | 11/1987 | United Kingdom . | |

*Primary Examiner*—Scott W. Cummings
*Attorney, Agent, or Firm*—Jacobson, Price, Holman & Stern, PLLC

[57] ABSTRACT

A sealing structure for use in an automobile engine includes a retainer 1, a plurality of lips 2a, 2b, 2c, 2d and a metal ring 3. The retainer 1 has a main annular body made of a resin material. The lips 2a, 2b 2c, 2d are formed on the metal ring 3. After that, the metal ring 3 and the lips together are inserted in a die so as to produce the retainer 1 by an injection molding method. Thus, the retainer 1, the lips and the metal ring 3 are formed as an integral unit. Two inner lips 2a, 2d are positioned at an inner periphery of the ring 3 and contact a shaft 6 for the engine, while the other two outer lips 2b, 2c are made of a resilient or elastic material and positioned at an outer periphery of the ring 3 so that the main body of the retainer 1 supports the ring 3 and the inner lips 2a, 2d in a floating manner. (FIG. 2 A)

5 Claims, 5 Drawing Sheets

5,588,656

CRANKSHAFT SEAL HAVING RESILIENT PORTION EMBEDDED IN RIGID RETAINER

BACKGROUND OF THE INVENTION

This invention relates to a sealing structure for a mechanism such as an automobile engine in which a movable part such as a crankshaft passes through a structural component such as an engine block and must be sealed against leakage of fluid such as oil.

FIG. 8 shows a conventional sealing structure for use in an automobile engine. A sealing assembly A' includes a metal retainer 101, a lip 102, a shaft 106 and an engine block 107 ran engine body. The lip 102 is formed of a rubber material as to be integral with the retainer 101 as a seal lip. The retainer 101 is fixed to the engine block 107 by means of bolts 111 and has a groove 109 in which an O-ring 110 is arranged for the purpose of oil seal between the retainer 101 and the engine block 107. The lip 102 has a main lip portion 102a which contacts an outer peripheral portion of the shaft 106 in a slidable manner, and an auxiliary lip portion 102b which is formed outside the main lip portion 102a and positioned so as to face the atmosphere. The retainer 101 has a joint portion 101a at an inner peripheral portion thereof, to which the lip 102 is joined in a fixed manner. Thus, the retainer 101 and the lip 102 are assembled as an integral unit. A spring 105 is placed on an outer peripheral portion of the main lip portion 102a for the purpose of adjusting a pressure of the main lip portion 102a against the shaft 106.

However, in the conventional sealing structure, when heat is transferred from the engine block 107 to the retainer 101, the retainer 101 is deformed so as to deform further the lip 102. In case the retainer is made of a resin material, it is apt to be remarkably deformed, and the lip is affected by such deformed shape of the retainer which takes place when the resin material is shaped and then solidified. In such a case, a gap is formed between the outer periphery of the shaft 106 and the main lip portion 102a, and the contact therebetween is biased so as to result in an abnormal one. As a result, the sealing structure has poor sealing characteristics so that oil leakage may take place.

SUMMARY OF THE INVENTION

It is the object of this invention to provide a sealing structure in which unproper deflection or deforming of a lip can be minimized or avoided even if a retainer is affected by heat or others.

According to this invention, a sealing structure comprises a retainer, a lip means for the sealing purpose and a rigid ring fixed to the retainer and having an inner periphery and an outer periphery. The lip means includes an inner lip means which is annular and placed at the inner periphery of the ring and an outer lip means which is annular and placed at the outer periphery of the ring. The outer lip means has a resilient or elastic portion embedded in the retainer in such a manner that the retainer can support the ring and the inner lip means in a floating condition.

In a preferred mode of this invention, the retainer has a main body made of a resin material, and the resilient or elastic portion is embedded in the main body made of the resin material. The retainer, the lip means and the ring are formed as a single integral unit by an insert injection molding method. The resilient or elastic portion is made of a rubber material. The elastic or resilient portion of the outer lip means includes a first outer lip projecting in an oblique direction from an intermediate portion or bent portion of the ring and a second outer lip projecting in an oblique direction from an outer edge portion of the ring. The inner lip means may have a similar integral unit type structure.

In another mode of the invention, at least of the first outer lip and the second outer lip has a tip portion and a base portion in which the thickness of the tip portion is larger than the thickness of the base portion.

In still another mode of this invention, the ring has a L-shaped cross section having a bent corner, and the first outer lip is positioned at the bent corner of the ring. Also, the ring can have a Z-shaped cross section having two bent corners, and the first outer lip is positioned at one of the bent corners of the ring.

In a further mode of this invention, a plurality of ribs are integrally formed on an inner peripheral portion of the main body of the retainer at a predetermined interval for supporting the ring and the inner lip means together in a balanced condition.

Because the lip means is combined with the ring functioning as a core, even if the retainer is affected by other members, heat and so on, unproper deflection or deforming of the lip means and particularly an inner main lip which is to contact an element such a crankshaft of an automobile engine can be effectively minimized or avoided.

In case the outer lips are placed between the metal ring and the retainer, the deformation of the retainer can be absorbed by the lips which are made of a resilient material. Thus, the ring is not directly affected by the deformation of the retainer so that unproper deformation of the main lip can be avoided.

Also, even if the ring and the lip means are slightly dislocated in the retainer when the resin material is solidified, the unproper deformation of the main lip can be avoided due to so called floating effects.

The ring may be made of any rigid material although the metal ring will be shown and explained. For example, the ring may be made of a ceramic material.

BRIEF DESCRIPTION OF THE DRAWINGS

Embodiments of this invention will now be described, by way of example, with reference to the accompanying drawings in which.

DETAILED DESCRIPTION OF THE EMBODIMENTS

Figure 1A:
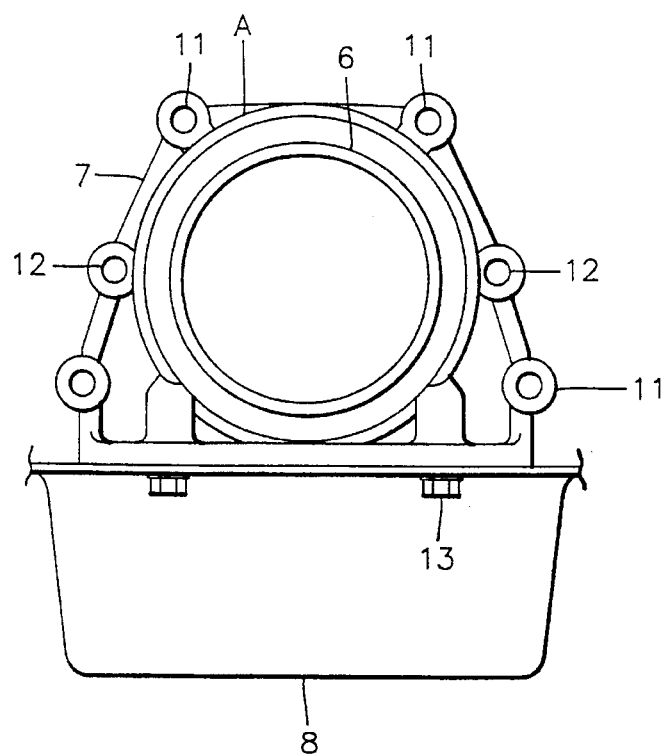
FIG. 1A is a front view showing a sealing structure according to an embodiment of this invention.
Figure 1B:
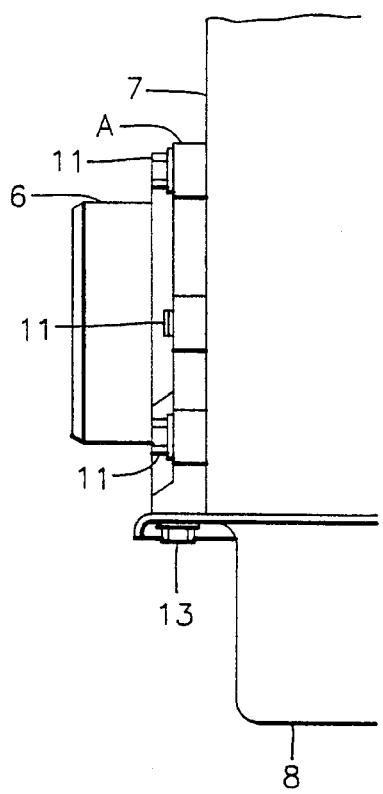
FIG. 1B is a side view of the sealing structure shown in FIG. 1A.

Referring to FIGS. 1A, 1B, 2A and 2B, a sealing structure according to a preferred embodiment of this invention is used in an automobile engine.

A sealing structure A includes an engine block 7 for a main engine body, a shaft 6 and a sealing means between the engine block 7 and the shaft 6. The shaft 6 passes through the engine block 7 and projects slightly therefrom in a conventional manner. The sealing means of the sealing structure A includes a retainer 1 functioning as a holding member, and a sealing body a. The retainer 1 is made of a resin material. The sealing body a includes a metal ring 3 functioning as a core, reinforcing or supporting member, and a lip means 2 made of a resilient material and attached to the metal ring 3 for the sealing purpose. The retainer 1 is fixed to the engine block 7 by means of plural bolts 11. Two locating pins 12 are used so as to position the retainer 1 relative to an attached surface of the engine block 7 so that a predetermined portion of the lip means 2 can contact a peripheral portion of the shaft 6 in a proper sliding manner for the sealing purpose. An oil pan 8 for containing oil therein is fixed to a lower portion of the engine block 7 by plural bolts 13.

Figure 2A:
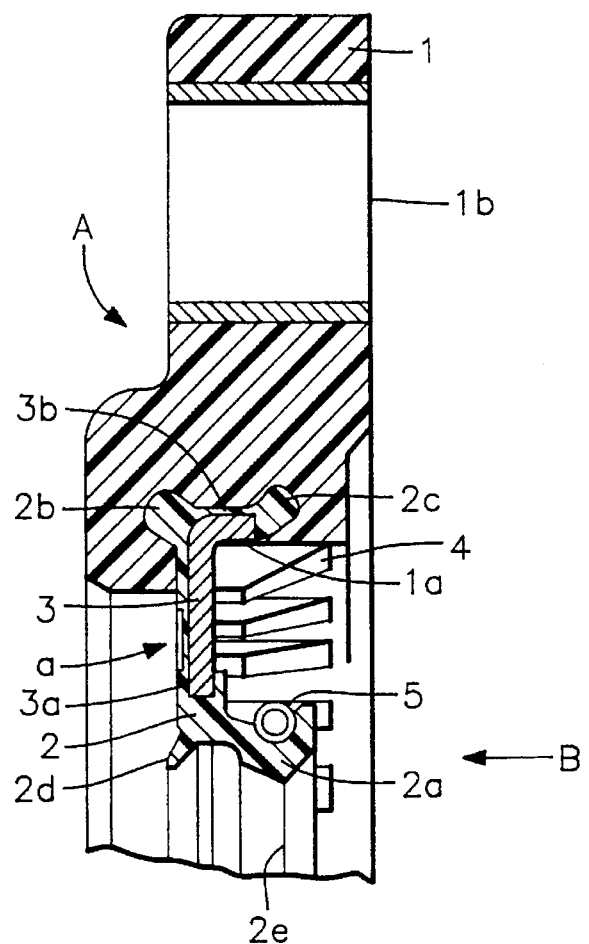
FIG. 2A is an enlarged sectional view showing a lip and its related portions of the sealing structure shown in FIG. 1A.
Figure 2B:
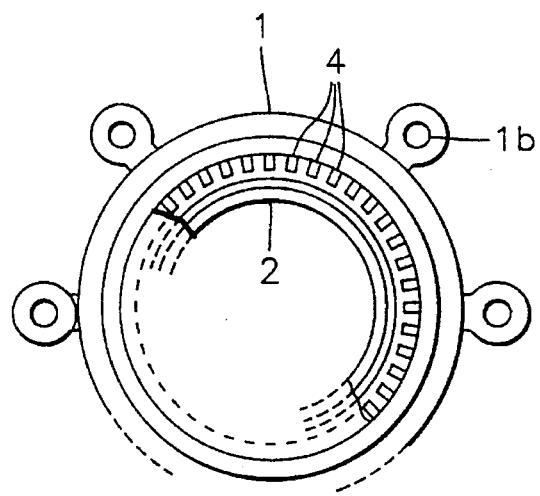
FIG. 2B is a side view showing a portion of the sealing structure shown in FIG. 2A.
Figure 3:
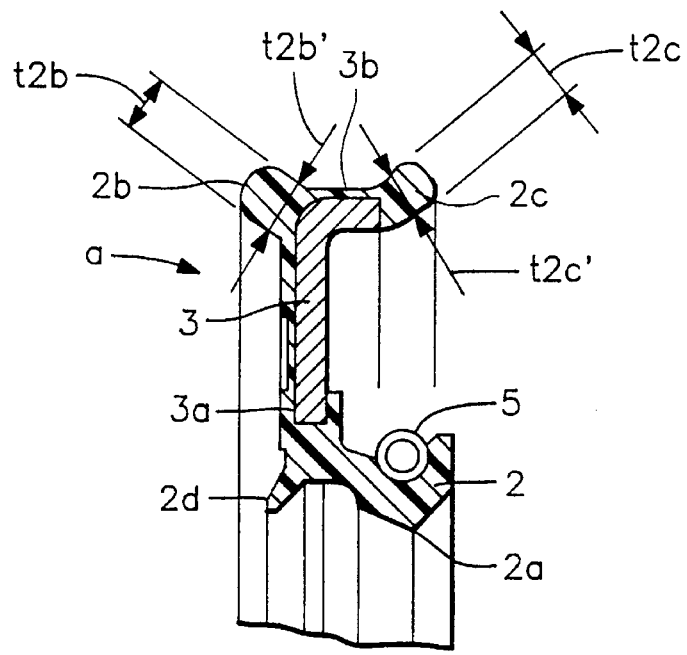
FIG. 3 is a sectional view showing a lip provided in the sealing structure shown in FIG. 2A.

Referring to FIGS. 2A, 2B and 3, the metal ring 3 has a substantially L-shape in cross-section and extends in a circular direction around the outer periphery of the shaft 6 with a gap or clearance when the retainer 1 is fixed to the engine block 7. The ring 3 includes an inwardly extending portion 3a and a cylindrical portion 3b integrally fixed to an outer peripheral edge of the inwardly extending portion 3a. The lip means 2 includes a plurality of lips 2a, 2b, 2c, 2d arranged on the ring 3 in an integral or separate manner. Each of the lips is preferably made of a rubber material.

As shown in FIG. 2A, the lip 2a extends in a ring or flange shape from an inner peripheral edge portion 3a of the ring 3 toward the attached surface of the engine block 7. The lip 2a functions as a main lip and has an inner tip portion 2e at its inner periphery along a circle having the minimum diameter so that the peripheral tip portion 2e can contact the outer periphery of the shaft 6. The lip 2d functions as an auxiliary lip and is positioned outside the tip portion 2e so as to face the atmosphere in such a manner that an inner peripheral edge of the lip 2d can contact slightly the outer periphery of the shaft for the sealing purpose. The main lip 2a and the auxiliary lip 2d are formed as an integral element placed at the inner periphery of the ring 3.

Referring to FIG. 3, the lip 2b and the lip 2c are formed as a first outer lip and a second outer lip, respectively, at the outer periphery of the ring 3. The first outer lip 2b projects outwardly in an oblique direction from a bent joint portion of the inwardly extending portion 3a and the cylindrical portion 3b of the ring 3 so as to have a large diameter. The thickness t2b of a tip portion of the first outer lip 2b is slightly larger than the thickness t2b' of a base portion of the first outer lip 2b. The second outer lip 2c projects outwardly in an oblique direction from a right edge of the cylindrical portion 3b of the ring 3 so as to have a large diameter. The thickness t2c of a tip portion of the second outer lip 2c is slightly larger than the thickness t2c' of a base portion thereof. The tip portion and the base portion of the lips 2b, 2c correspond to a head and a neck, respectively. In FIG. 2A and FIG. 2B, a plurality of ribs 4 are integrally formed on the whole inner periphery of the resin material of the retainer 1 at an identical interval. Each of the ribs 4 extends in a radius direction. In case the ribs 4 are provided, when the retainer 1 is formed, the ribs 4 and the resin material are pressed against both opposite sides of an outer peripheral portion of the ring 3 and the lip means 2 in a balanced condition. Any shape of the ribs 4 can be employed if such a balanced condition can be obtained.

In the sealing structure A of FIGS. 2A and 2B, no gap is formed between the resin material and the first and second outer lips 2b, 2c so that the lip means 2 and the ring 3 can be integrally fixed to the resin material at the joint portion 1a as an integral unit.

A ring-shaped spring 5 is placed on the outer periphery of the main lip 2a so as to adjust the pressure of the main lip 2a against the shaft 6 when the retainer 1 is properly attached to the engine block. The retainer 1 has a plurality of holes 1b through which bolts 11 are inserted so as to fix the retainer 1 to the engine block 7.

Figure 8:
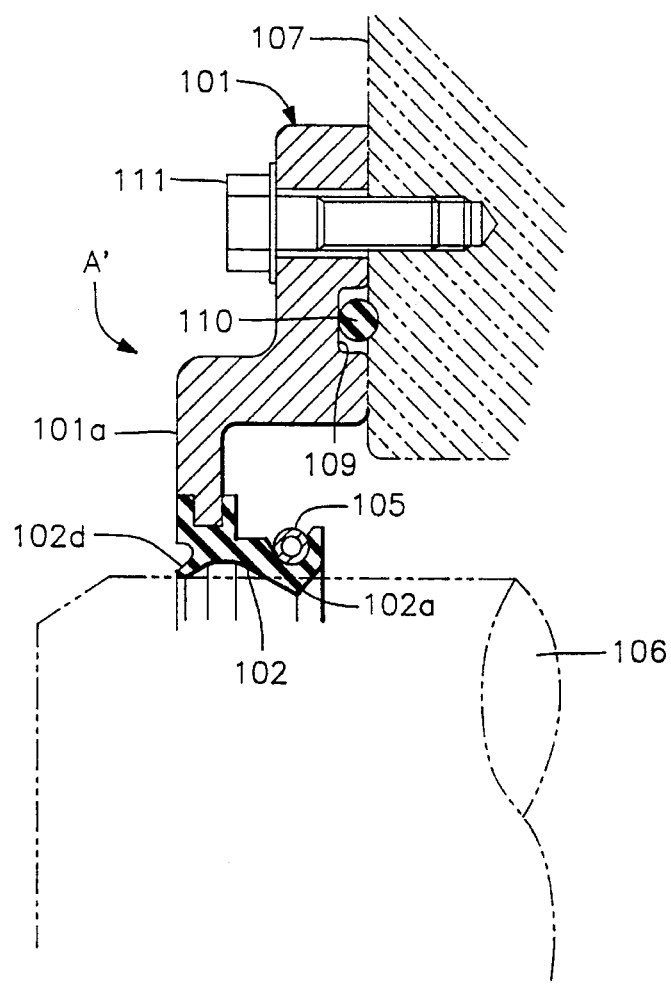
FIG. 8 is a sectional view showing a conventional sealing structure for use in an automobile engine.

A groove may be formed in the retainer 1 like in the retainer 101 of FIG. 8 so that an O-ring or gasket is arranged in the groove for the oil sealing purpose.

Because the lip means 2 is combined with the ring 3 functioning as a core, even if the retainer 1 is affected by other members, unproper deforming of the lip means 2 and particularly the main lip 2a can be effectively avoided.

In case the first and second outer lips 2b, 2c are placed between the metal ring 3 and the joint portion 1a of the retainer 1, the deformation of the retainer 1 can be absorbed by the lips 2b, 2c because the lips are made of a resilient material. Thus, the ring 3 is not directly affected by the deformation of the retainer 1 so that unproper deformation of the main lip 2a can be avoided.

Also, even if the ring 3 and the lip means 2 are slightly dislocated in the retainer 1 when the resin material is solidified, the unproper deformation of the main lip can be avoided due to so called floating effects.

The ring 3 may be made of any rigid material although the metal ring is shown and explained. For example, the ring may be made of a ceramic material.

The shape of the outer lips 2b, 2c is not limited to the above-stated embodiment and may be modified if the deformation of the retainer cannot be easily transferred to the ring.

Figure 5:
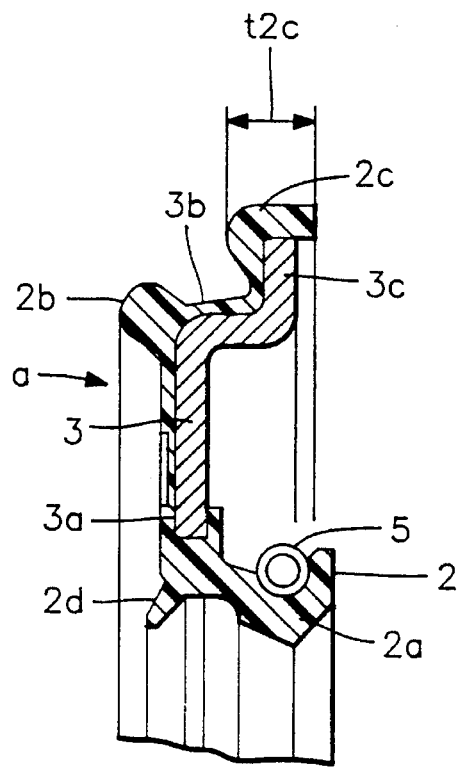
FIG. 5 is an enlarged sectional view showing a lip and its related portions in the sealing structure shown in FIG. 4.
Figure 4:
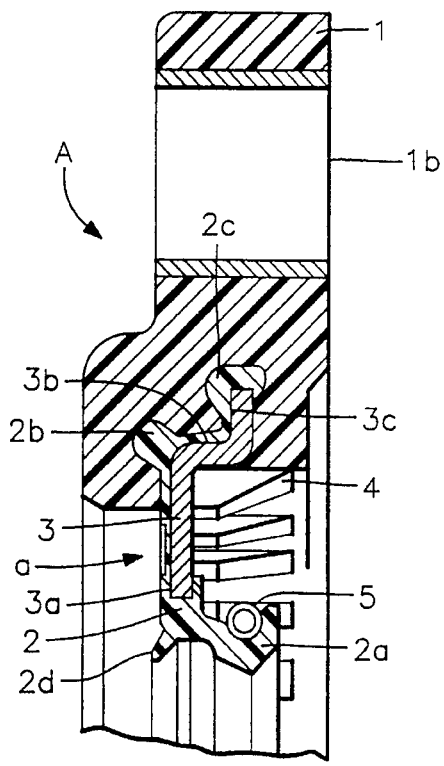
FIG. 4 is a sectional view, corresponding to FIG. 2A, showing a sealing structure according to a further embodiment of this invention.

FIG. 4 shows a sealing structure according to a further embodiment of this invention. FIG. 5 shows a lip means and a ring in the sealing structure of FIG. 4.

The embodiment of FIGS. 4 and 5 is substantially the same as that of FIGS. 1A, 1B, 2A, 2B and 3 except the shape of the ring 3 and its related portions such as the outer lips 2b, 2c.

Referring to FIGS. 4 and 5, the metal ring 3 has a substantially Z-shape in cross-section and extends in a circular direction around the outer periphery of the shaft 6 with a gap or clearance when the retainer 1 is fixed to the engine block 7. In other words, the metal ring 3 is similar in shape to a hat having an open head.

The ring 3 includes an inwardly extending portion 3a, a cylindrical portion 3b and an outer peripheral flange portion 3c, all of which are integrally formed as a single member. The flange portion 3c extends outwardly. The lip means 2 includes a plurality of lips 2a, 2b, 2c, 2d arranged on the ring 3 in an integral or separate manner. Each of the lips is preferably made of a rubber material.

As shown in FIGS. 4 and 5, the lip 2a extends from an inner peripheral edge portion 3a of the ring 3 toward the attached surface of the engine block 7 and is substantially the same as that of the above-stated embodiment, which functions as a main lip. Also, the lip 2d is substantially the same as that of the above-stated embodiment, which functions as an auxiliary lip. The main lip 2a and the auxiliary lip 2d are formed as an integral element placed at the inner periphery of the ring 3.

Referring to FIG. 5, the lip 2b and the lip 2c are formed as a first outer lip and a second outer lip, respectively, at the outer periphery of the ring 3. The first outer lip 2b projects outwardly in an oblique direction from a bent joint portion of the inwardly extending portion 3a and the cylindrical portion 3b of the ring 3 so as to have a large diameter. The thickness of a tip portion of the first outer lip 2b is slightly larger than the thickness of a base portion of the first outer lip 2b. The second outer lip 2c projects outwardly in an oblique direction from an outer edge of the flange portion 3c of the ring 3 so as to have a large diameter. The thickness of a tip portion of the second outer lip 2c is slightly larger than the thickness of a base portion thereof. The tip portion and the base portion of the lips 2b, 2c correspond to a head and a neck, respectively. As the flange portion 3c is additionally provided, the ring can have more improved rigid performance.

In FIG. 4, a plurality of ribs 4 are integrally formed on the whole inner periphery of the resin material of the retainer 1 at identical intervals. Each of the ribs 4 extends in a radius direction. In case the ribs 4 are provided, when the retainer 1 is formed, the ribs 4 and the resin material are pressed against both opposite sides of an outer peripheral portion of the ring 3 and the lip means 2 in a balanced condition.

In the sealing structure A of FIGS. 4 and 5, no gaps are formed between the resin material and the first and second outer lips 2b, 2c so that the lip means 2 and the ring 3 can be integrally fixed to the resin material at the joint portion 1a as an integral unit.

A ring-shaped spring 5 is placed on the outer periphery of main lip 2a like in the above-stated embodiment.

Because the ring 3 functioning as a core includes the flange portion 3c, the rigidity of the ring can be improved in comparison with the above stated embodiment. For example, unproper deforming of the lip means 2 and particularly the main lip 2a can be effectively avoided. In addition, as the first and second outer lips 2b, 2c are placed between the metal ring 3 and the retainer 1, the deformation of the retainer 1 can be absorbed by the lips 2b, 2c because the lips are made of a resilient material. Thus, the ring 3 is not directly affected by the deformation of the retainer 1 so that unproper deformation of the main lip 2a can be avoided. Also, even if the ring 3 and the lip means 2 are slightly dislocated in the retainer 1 when the resin material is solidified, the unproper deformation of the main lip can be avoided due to so called floating effects.

Figure 6:
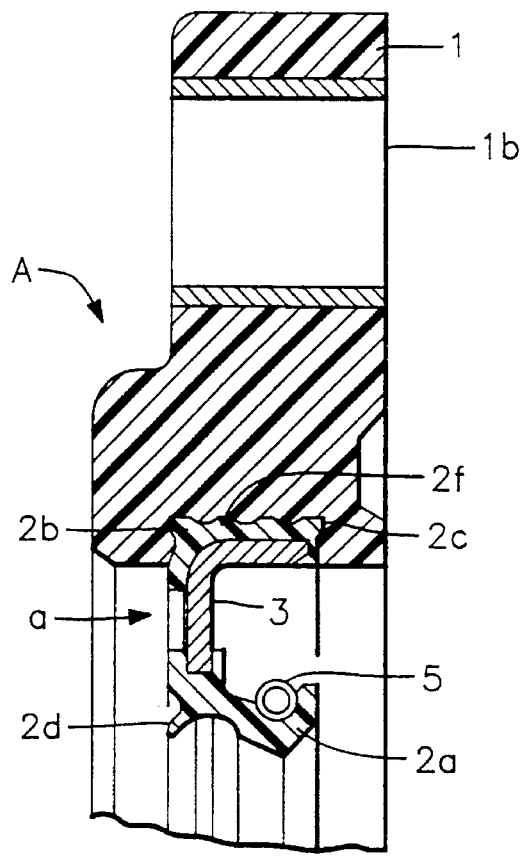
FIG. 6 is a sectional view, corresponding to FIG. 2A, showing a sealing structure according to another embodiment of this invention.
Figure 7:
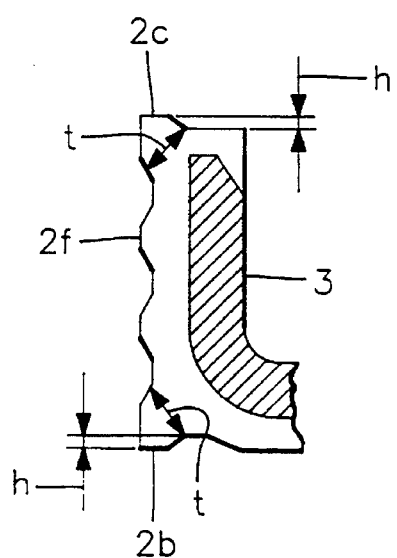
FIG. 7 is an enlarged sectional view showing a lip and its related portions of the sealing structure shown in FIG. 6.

FIG. 6 shows a sealing structure according to a further embodiment of this invention. FIG. 7 shows a lip means and a ring in the sealing structure of FIG. 5.

The embodiment of FIGS. 6 and 7 is substantially the same as that of FIGS. 1A, 1B, 2A, 2B and 3 except the shape of the ring 3 and its related portions such as the outer lips 2b, 2c.

Referring to FIGS. 6 and 7, the metal ring 3 has a substantially L-shape in cross-section and extends in a circumferential direction around the outer periphery of the shaft 6 with a gap or clearance when the retainer 1 is fixed to the engine block 7. In other words, the metal ring 3 is similar in shape to a dish having an open base.

The ring 3 includes an inwardly extending portion 3a and a cylindrical portion 3b fixed thereto, all of which are integrally formed as a single member. The lip means 2 includes a plurality of lips 2a, 2b, 2c, 2d arranged on the ring 3 in an integral or separate manner. Each of the lips is preferably made of a rubber material.

As shown in FIGS. 6 and 7, the lip 2a extends from an inner peripheral edge portion 3a of the ring 3 toward the attached surface of the engine block 7 and is substantially the same as that of the above-stated embodiment, which functions as a main lip. Also, the lip 2d is substantially the same as that of the above-stated embodiment, which functions as an auxiliary lip. The main lip 2a and the auxiliary lip 2d are formed as an integral element placed at the inner periphery of the ring 3.

Referring to FIG. 6, the lip 2b and the lip 2c are formed as a first outer lip and a second outer lip, respectively, at the outer periphery or the cylindrical portion 3b of the ring 3. The first outer lip 2b projects outwardly in an oblique direction from a bent portion of the inwardly extending portion 3a and the cylindrical portion 3b of the ring 3 so as to have a large diameter. The thickness t of the first outer lip 2b is 0.9 mm to 1.0 mm. The second outer lip 2c projects outwardly in an oblique direction from an outer edge of the flange portion 3c of the ring 3 so as to have a large diameter. The thickness t of the second outer lip 2c is also 0.9 mm to 1.0 mm. As shown in FIG. 7, the height of the lips 2b and 2c is about 0.3 to 0.4 mm. The tip portion and the base portion of the lips 2b, 2c have a cross-sectional shape of a hat with a pointed crown. The outer periphery of the ring 3 has an irregular surface 2f between the two lips 2b, 2c so as to increase the bonding force between the resin material and rubber material of the lip means. For example, the irregular surface 2f of the rubber material has two projections with a height of 0.25 mm and a width of 0.5 mm between which a groove with a width of 0.4 mm formed. In FIG. 6, any ribs are not provided, but a plurality of ribs can be provided integrally on the whole inner periphery of the resin material of the retainer 1 at identical intervals in such manner that each of the ribs extends in a radius direction.

In the sealing structure A of FIGS. 6 and 7, no gaps are formed between the resin material and the first and second outer lips 2b, 2c so that the lip means 2 and the ring 3 can be integrally fixed to the resin material as an integral unit.

A ring-shaped spring 5 is placed on the outer periphery of the main lip 2a like in the above-stated embodiment.

Because the first and second outer lips 2b, 2c are placed between the metal ring 3 and the retainer 1 in such a way that the ring 3 does not directly contact the resin material of the retainer 1, the deformation of the retainer 1 can be remarkably absorbed by the lips 2b, 2c because the lips are made of a resilient material. Thus, the ring 3 is not directly affected by the deformation of the retainer 1 so that unproper deformation of the main lip 2a can be avoided. Also, even if the ring 3 and the lip means 2 are slightly dislocated in the retainer 1 when the resin material is solidified, the unproper deformation of the main lip can be avoided due to so called floating effects.

A method of producing the sealing structure A of the above stated embodiments will be explained.

One of the best methods of fixing a metal ring to a retainer is an insert injection molding method without any welding steps. A fixed portion of the metal ring is inserted into a resin material of the retainer so that the affect of deflection or deforming of the retainer can be avoided or minimized.

First, the lips 2a, 2b, 2c, 2d are formed on the ring 3 so as to constitute the lip means 2. It is preferable that the size of the lips 2b, 2c is as small as possible in order to avoid the deformation thereof due to injection molding flows. Next, the ring 3 provided with the lip means 2 is inserted and positioned in a die means (not shown) for producing the retainer 1. After that, in order to carry out an injection molding process, a resin material is set in the die means in such a manner that both the first outer lip 2b and the second outer lip 2c are embedded in the resin material. Thus, the retainer 1, the metal ring 3 and the lip means 2 are integrally formed in such a condition that an outer peripheral portion of the metal ring 3 and the lips 2b, 2c are embedded or inserted in the resin material of the retainer 1. It is preferable that the lip means 2 is made of a rubber material having an excellent heat resistance so as to minimize or avoid effects due to heat produced when the injection molding is carried out.

Examples of the resin material are phenol resin, polyphenylene sulfide, polyamide or the like, but the present invention is not limited to them.

I claim:

1. A sealing structure comprising a retainer, a lip means for providing a sealing effect and a rigid ring fixed to the retainer and having an inner periphery and an outer periphery, the lip means being fixed to the ring, the lip means including an inner lip means which is annular and placed at the inner periphery of the ring and an outer lip means which is annular and placed at the outer periphery of the ring, the outer lip means having a resilient or elastic portion embedded in the retainer in such a manner that the retainer can support the ring and the inner lip means in a floating condition, wherein the elastic or resilient portion of the inner lip means includes a first outer lip projecting in an oblique direction from an intermediate portion of the ring and a second outer lip projecting in an oblique direction from an outer edge portion of the ring.

2. A sealing structure as defined in claim 1, wherein at least of the first outer lip and the second outer lip has a tip portion and a base portion in which the thickness of the tip portion is larger than the thickness of the base portion.

3. A sealing structure as defined in claim 1, wherein the ring has a L-shaped cross section having a bent corner, and the first outer lip is positioned at the bent corner of the ring.

4. A sealing structure as defined in claim 1, wherein the ring has a Z-shaped cross section having two bent corners, and the first outer lip is positioned at one of the bent corners of the ring.

5. A sealing structure as defined in claim 1, wherein the elastic or resilient portion of the outer lip means includes an irregular surface between the first outer lip and the second outer lip so as to improve the bonding between the outer lip means and the ring.

* * * * *